G. W. BELDAM.
ENGINE OR MACHINE PACKING.
APPLICATION FILED MAR. 6, 1914.
1,128,745.
Patented Feb. 16, 1915.
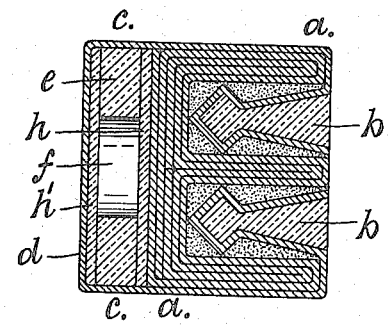
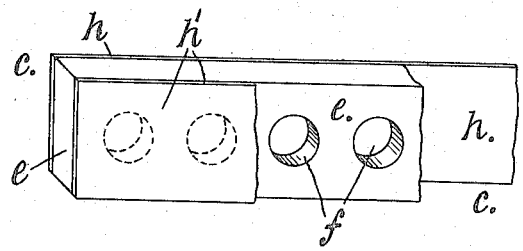
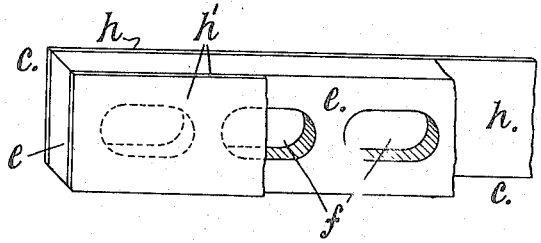
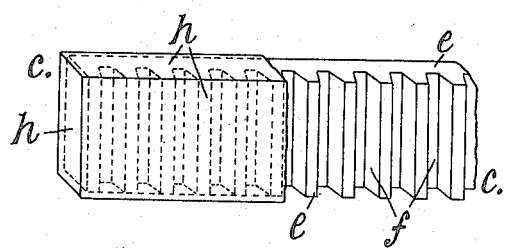
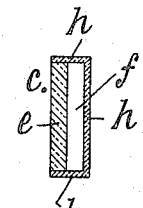
Witnesses
F. M. Meyer
Inventor
G. W. Beldam.
By Atty.

UNITED STATES PATENT OFFICE.

GEORGE WILLIAM BELDAM, OF EALING, ENGLAND.

ENGINE OR MACHINE PACKING.

1,128,745.
Specification of Letters Patent.
Patented Feb. 16, 1915.

Application filed March 6, 1914. Serial No. 822,973.

*To all whom it may concern:*

Be it known that I, GEORGE WILLIAM BELDAM, a subject of the King of England, residing at Ealing, in the county of Middlesex, England, have invented certain new and useful Improvements in and Connected with Engine or Machine Packings, of which the following is a specification.

This invention has reference to packings used in connection with engines, pumps, or machinery, for making fluid tight joints between parts having relative movement, such as piston rods, and valve rods, and for engines, pumps and the like; and it relates more particularly to packings—say those of the "semi-metallic" or like types of packing; or soft type—in which in connection with the packing portion proper which works in connection with the rod or other surface to be packed, or to be rendered fluid tight, there is employed a backing of more or less soft or resilient material, the object and effect of which is to provide a species of cushion and automatic adjusting medium at the back of the packing.

In the following description of packing, or packing backing, the improvements hereunder are comprised.

In connection with packing of the kind referred to, say one adapted for use in packing or stuffing boxes of fluid pressure engines, for rendering the joint between the packing and the rod fluid tight, the backing is of a character, or so formed, constructed, or arranged, that air at natural pressure is held by it in cells or cavities, or spaces; and in use or practice constitutes an effective resilient or pneumatic backing, which better serves the purposes for which said backings are employed in connection with packings.

The material of which the backing is made in some cases, is rubber (preferably steam proof rubber or other similar elastic or resilient material); and in such a case, according to one method of making the cellular backing, the rubber or like material is taken, say, in the form of a strip in dough or unvulcanized condition, and cells or holes are formed in it in any suitable way, at intervals; and in the case of the cells or holes being on each side, a strip of rubber is placed over the surface of the strip—also in dough form—and the backing so formed, if it is to be applied to a packing containing rubber to be vulcanized, is placed on the packing body proper, and the whole is vulcanized together; whereas, when used on packing which is not vulcanized, the cellular backing made of rubber as described, may be vulcanized alone, and attached to the packing, as and when desired. The cells or holes in the backing—of which preferably there will be a large number—will hold so many quantities of captivated or locked air, which add to the resiliency of the backing, and constitute a species of pneumatic natural air pressure backing; and in use, as it is pressed upon by the gland in the stuffing box, the air becomes compressed, which assists resiliency. The forms of the cells or holes or spaces for holding and retaining the air may be various; and in some cases, instead of the rubber being built as above described, it may be provided with apertures or recesses of the form of grooves and ridges, that is to say in corrugated form on one or both sides, similar to the teeth of toothed wheels; and these may be used in the case where the rubber is vulcanized before being fixed on the packing, or otherwise. In any case, the improved packing is one by which air at natural pressure is imprisoned or retained and employed; which, when the packing is in an engine stuffing box, and becomes slightly heated, or when the gland is screwed down, or under like conditions, an effectual resilient or cushion effect is produced.

The invention is illustrated in the accompanying drawings, Figure 1 being a cross section of an engine packing provided with the pneumatic backing; and Figs. 2, 3, 4, and 5 are views illustrating packing backings of several slightly modified forms.

Referring first to Fig. 1, the body of the packing is designated $a$; and it may be assumed to be of a modern known type, and what is sometimes called "semimetallic" packing, having slotted metallic bars $b$ in it, contained within outer laminæ of soft material such as folded asbestos, or other textile fabric, or the like. The backing portion is designated $c$, and in the case illustrated in Fig. 1, is shown to be held on to the body $a$ by a lamina $d$ of binding of textile or other suitable fabric. This backing $c$, in this case, is shown to be of the form illustrated in detail in Figs. 2 and 3; that is, it consists of a relatively wide strip $e$ of india-rubber or like material, having a multiplicity of cylindrical or oblong cavities or cells $f$ in it, the ends of which are closed and sealed by thin bands or strips of rubber $h, h^1$. If this rubber backing portion, consisting of the parts $e, h, h^1$, is made and formed in the manner herein described, the apertures $f$ will constitute closed or sealed cells or cavities containing air at atmospheric pressure. And when this is used in the packing, and subjected to heat, as it will be in the case of it being used as a steam engine packing, this air becomes heated and expands, and tends to force the backing at the top and bottom, and back, which is advantageous in practice.

In the modification shown in Figs. 4 and 5, the cavities $f$ are in the form of grooves formed between bars on one face (or it might be both faces) of the body of rubber or like material $e$. And the spaces are inclosed and sealed by a thin layer of rubber $h$ secured over the faces and the ends of these spaces, and fastened on to the body $a$, by solution or otherwise, in the manner referred to.

In cases where the packing is used for high pressure or superheated steam, the rubber used should be that called "steam proof" rubber.

In the case shown in Figs. 2 and 3, only single rows of holes are used, but there may be several rows of holes or cells, one above the other.

What is claimed is:—

1. The combination with a packing, adapted to be used to make fluid tight joints between parts having relative movement, of a backing composed of resilient material and having within it sealed cells or cavities containing air.

2. The combination with a packing, of a backing attached thereto, the said backing comprising a resilient portion having openings therethrough, and strips fastened to the resilient portion and closing the said openings, the parts arranged as and for the purpose described.

3. The combination with a semi-metallic packing, adapted to be used to make fluid-tight joints between parts having a relative movement, of a backing attached thereto, the said backing comprising a resilient member having openings, and strips closing the said openings and providing the means of attaching the resilient member to the packing, the parts arranged as and for the purpose described.

4. In engine or like packings adapted to make fluid-tight joints between parts having relative movement, a backing comprising a body portion formed from rubber and having cells therein made when the said rubber is in an unvulcanized condition, strips of rubber closing the said cells, the said strips applied in an unvulcanized condition, the strips and body portion vulcanized together and also to the said packing, substantially as described.

In testimony whereof I have signed my name to this specification in the presence of two subscribing witnesses.

GEORGE WILLIAM BELDAM.

Witnesses:
S. I. EARL,
CHAS. J. FALCONER.